(12) United States Patent
Mollick et al.

(10) Patent No.: US 6,227,790 B1
(45) Date of Patent: May 8, 2001

(54) AMUSEMENT RIDE VEHICLE WITH WHEELCHAIR RAMP

(75) Inventors: Horst Mollick; Dieter Hopfner, both of Offenberg (DE)

(73) Assignee: Universal Studios, Inc., Universal City, CA (US)

( * ) Notice: Subject to any disclaimer, the term of this patent is extended or adjusted under 35 U.S.C. 154(b) by 0 days.

(21) Appl. No.: 09/082,144

(22) Filed: May 20, 1998

(51) Int. Cl.[7] ........................................... B60P 1/00
(52) U.S. Cl. ........................ 414/541; 414/545; 414/921; 472/36
(58) Field of Search ..................... 414/537, 541, 414/545, 546, 462, 921; 472/3, 29, 36

(56) References Cited

U.S. PATENT DOCUMENTS

| | | |
|---|---|---|
| 2,449,829 | 9/1948 | Agren . |
| 3,757,972 | 9/1973 | Martin .................................. 414/462 |
| 4,103,934 * | 8/1978 | Arnholt et al. ....................... 280/744 |
| 4,155,468 | 5/1979 | Royce et al. . |
| 4,170,368 | 10/1979 | Southward et al. .................. 280/242 |
| 4,306,634 | 12/1981 | Sangster .............................. 187/9 R |
| 4,352,218 | 10/1982 | Lundberg ............................. 114/363 |
| 4,420,286 | 12/1983 | Hanson et al. . |
| 4,457,663 | 7/1984 | Hems et al. .......................... 414/921 |
| 4,522,390 * | 6/1985 | Kudler .................................. 272/29 |
| 4,759,682 | 7/1988 | Hood .................................... 414/522 |
| 4,787,111 | 11/1988 | Pacek et al. .......................... 414/921 |
| 4,865,312 * | 9/1989 | Katz ................................ 272/56.5 R |
| 5,026,243 * | 6/1991 | Dell ..................................... 414/522 |
| 5,040,936 | 8/1991 | Rhea . |
| 5,110,252 | 5/1992 | Aoki . |
| 5,154,569 | 10/1992 | Eryou et al. .......................... 414/921 |
| 5,165,389 | 11/1992 | Jing-Qi et al. ...................... 128/25 R |
| 5,259,081 * | 11/1993 | Henderson ............................. 296/61 |
| 5,331,701 * | 7/1994 | Chase et al. .......................... 414/921 |
| 5,375,962 * | 12/1994 | Kempf .................................. 414/541 |
| 5,380,144 | 1/1995 | Smith et al. . |
| 5,382,130 * | 1/1995 | Kempf .................................. 414/540 |
| 5,393,192 * | 2/1995 | Hall et al. ............................. 414/537 |
| 5,499,694 * | 3/1996 | Dorn .................................... 414/921 |
| 5,564,984 | 10/1996 | Mirabella et al. . |
| 5,613,825 | 3/1997 | Dorn . |
| 5,636,399 * | 6/1997 | Tremblay et al. .................... 414/537 |
| 5,676,515 | 10/1997 | Haustein ............................... 414/921 |
| 5,829,201 | 11/1998 | Schelter et al. ........................... 52/9 |
| 5,865,593 * | 2/1999 | Cohn .................................... 414/921 |
| 5,871,329 * | 2/1999 | Tidrick et al. ........................ 414/537 |
| 5,884,563 | 3/1999 | Sheldon et al. ......................... 104/53 |
| 5,935,011 | 8/1999 | Morgan et al. ........................ 472/29 |
| 6,102,648 | 8/2000 | Fretwell et al. ...................... 414/522 |

* cited by examiner

Primary Examiner—Douglas Hess
(74) Attorney, Agent, or Firm—Lyon & Lyon LLP

(57) ABSTRACT

An amusement ride vehicle includes a floor deck assembly slideably mounted inside the body of the vehicle when the vehicle is in motion and telescopically extended away from the body toward a loading platform when the vehicle is at rest. A ramp assembly is mounted to the floor deck assembly near the door of the vehicle and foldably extended away from and at an angle to the floor deck assembly when the ramp assembly is deployed to accommodate a guest in a wheelchair. To promote safety, the ramp and vehicle door preferably have automatic latch mechanisms. To maintain the ride capacity at all times, a companion seat is built into the vehicle body and a conversion seat hidden underneath the companion seat can be deployed if no guest in a wheelchair is being accommodated.

20 Claims, 8 Drawing Sheets

AMUSEMENT RIDE VEHICLE WITH WHEELCHAIR RAMP

BACKGROUND OF THE INVENTION

The field of the invention is amusement ride vehicles.

Amusement rides have been enjoyed by millions of people, and especially young people, for many years. Most rides, however, do not accommodate guests in wheelchairs. This is because most ride vehicles have some type of threshold at the vehicle entrance requiring the guest to step over during entry and exiting the vehicle. In addition, most ride vehicles have permanent seating arrangements typically in the form of benches stretching the width of the vehicle. Finally, most amusement rides are usually propelled along a fixed track. Due to safety concerns, the ride vehicle is properly located a distance away from, and typically at a different elevation than, the ride loading platform. As a result, guests in wheelchairs usually find themselves waiting on the loading platform for an attendant or assistant to help them onto and off the typical ride vehicle.

Recently there has been an increased emphasis in providing assistance to wheelchair users to conveniently and safely enter and exit a motor vehicle. Most of these efforts involve motorized ramps or hydraulic lifts which require significant time to deploy and space to store within the motor vehicle. However, few, if any, of these improvements have been used in the amusement ride industry. This is unfortunate. An amusement ride vehicle that accommodates a guest in a wheelchair solving the aforementioned problems is therefore needed.

SUMMARY OF THE INVENTION

The present invention is directed to an amusement ride vehicle having an integral wheelchair ramp. The ramp is preferably connected to a floor deck assembly designed to telescope out from the vehicle for guest access. To these ends, the floor deck assembly advantageously has a set of I-track guiderails slideably mounted to the frame of the vehicle. For the preferred embodiment, a set of L-track guiderails is slideably mounted to the I-track guiderails, and a platform on the L-track guiderails functions as the floor of the vehicle when the vehicle is in motion. When the vehicle is at rest, the floor deck assembly is extended away from the vehicle body, over water or other scenery, and stopped above the loading platform in order to deploy the wheelchair ramp.

In this manner, a guest in a wheelchair can advantageously proceed up the ramp and onto the floor of the vehicle, wait for the park operator to fold the ramp and slide the floor deck assembly back into the vehicle body, and enjoy an amusement ride without having to leave their wheelchair or turn it towards the direction of flow of the ride. To promote safety, the ramp and vehicle door preferably have automatic latch mechanisms. To maintain the ride capacity at all times, a companion seat may be attached to the frame of the vehicle with a conversion seat hidden underneath the companion seat if no guest in a wheelchair is being accommodated.

Accordingly, it is an object of the present invention to provide an amusement ride vehicle that accommodates a guest in a wheelchair. Other and further objects and advantages of the present invention will be further understood and appreciated by those skilled in the art by reference to the following specification, claims, and annexed drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
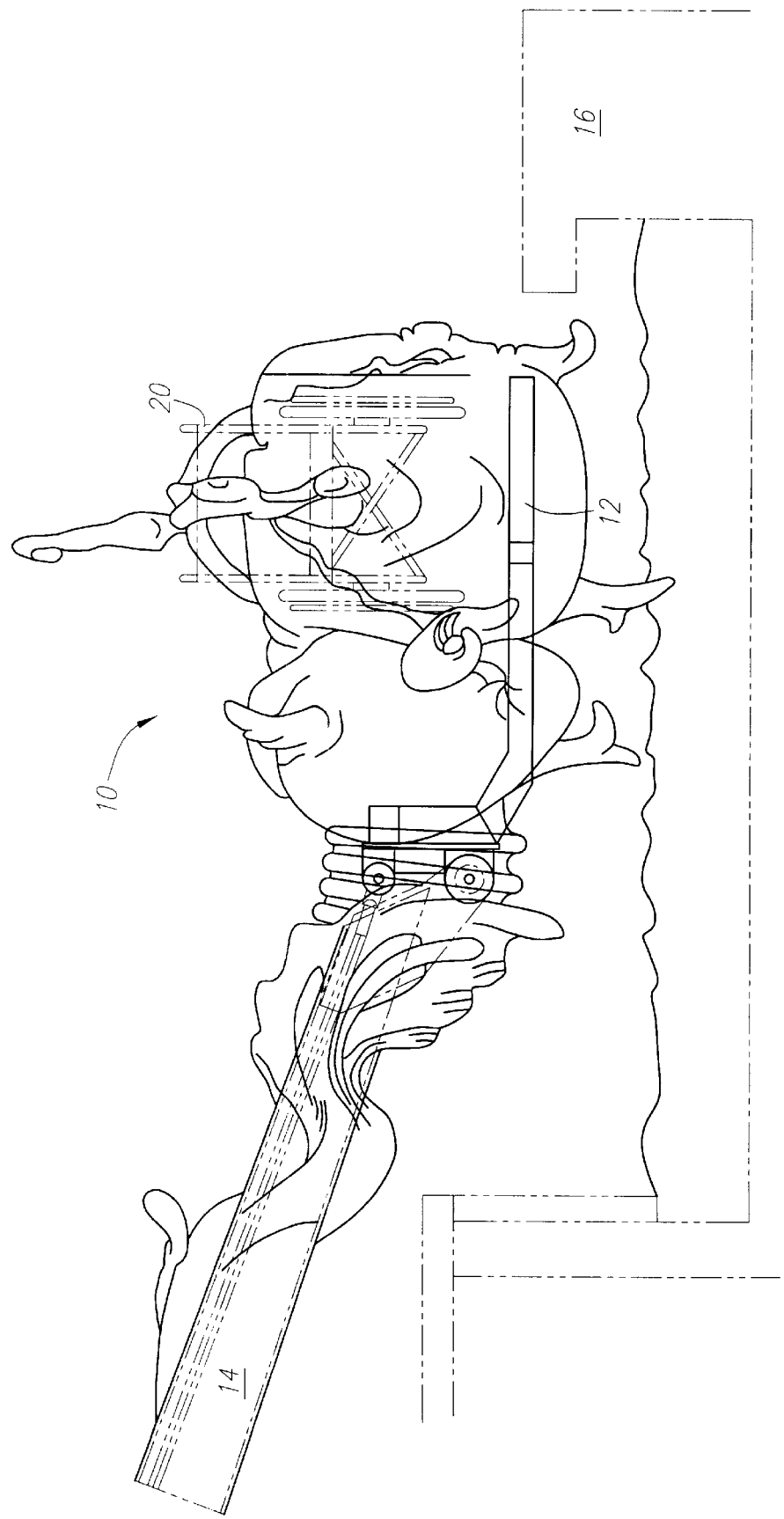
FIG. 1 is a rear environmental view of the amusement ride vehicle with wheelchair ramp according to a preferred embodiment of the present invention.
Figure 2:
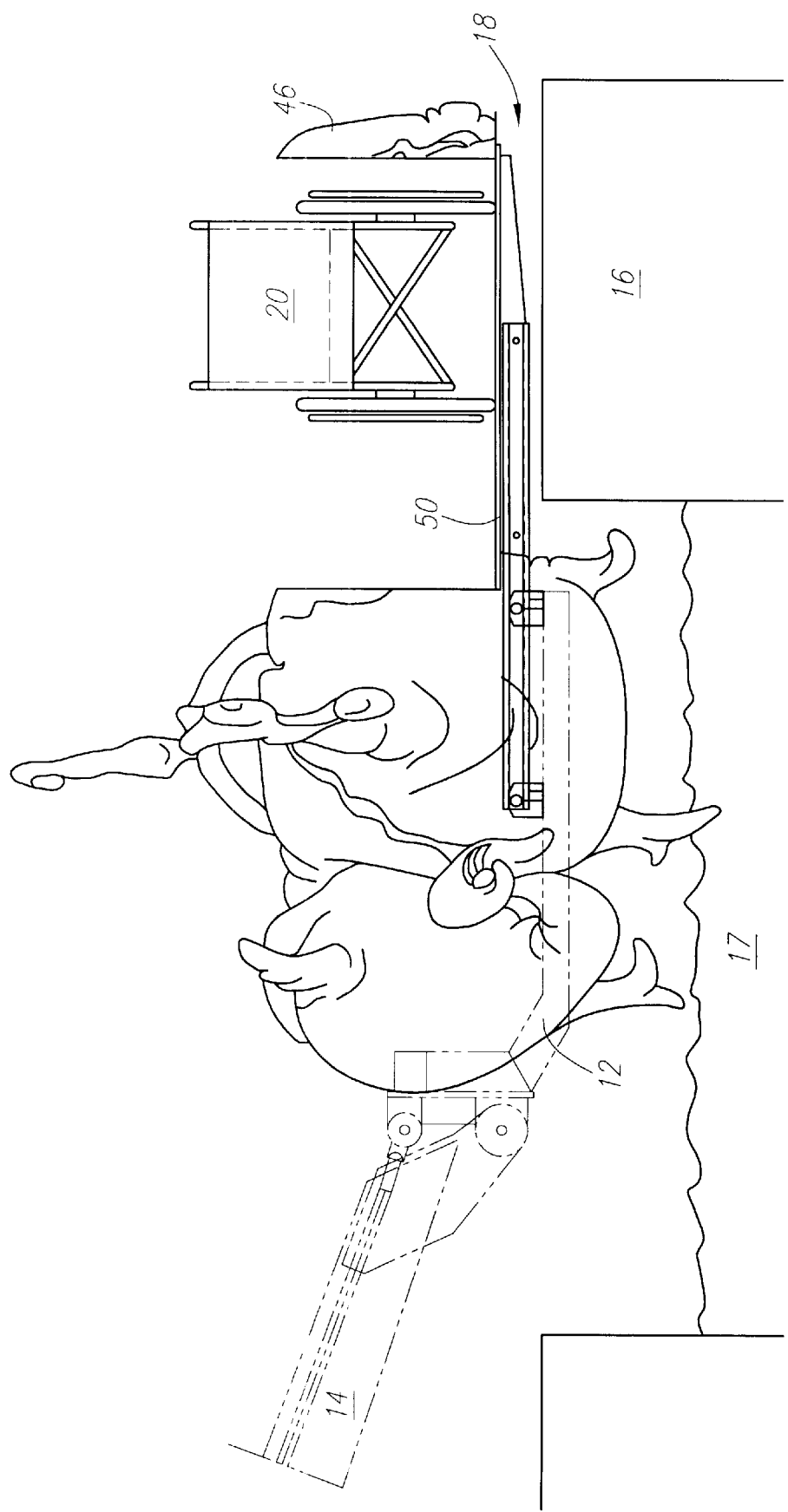
FIG. 2 is a rear view of the vehicle shown in FIG. 1 with the floor deck assembly in an extended position.
Figure 8:
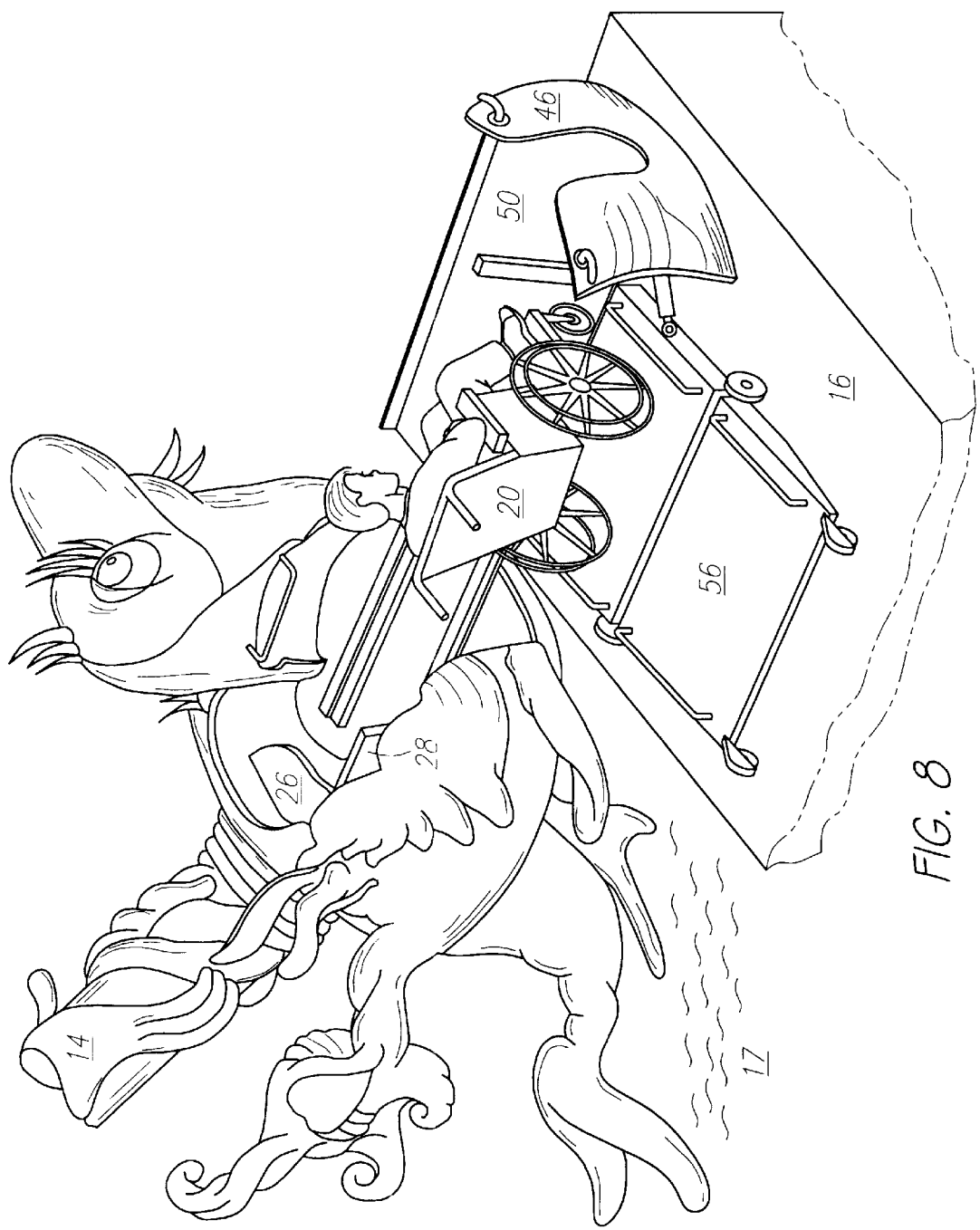
FIG. 8 is an environmental perspective view of the amusement ride vehicle with the ramp assembly in an extended position.

Turning in detail to the drawings, as shown in FIGS. 1, 2, and 8, the amusement ride vehicle 10 has two support beams 12 mounted to an arm 14. The arm 14 supports the vehicle 10 over water 17 or other scenery as the vehicle 10 travels about a fixed circular path. The vehicle 10 is elevated above and a safe distance from the loading platform 16 where guests are positioned for the next ride. Referring to FIG. 2, the vehicle 10 has a floor deck assembly 18 supported by the support beams 12. A wheelchair 20 can be seen positioned on the floor 50 of the floor deck assembly 18 at an elevation above the loading platform 16. As shown in FIG. 2, the floor deck assembly 18 is adapted to telescopically extend away from the vehicle 10, over the water 17, and stop above the loading platform 16. In both FIGS. 1 and 2, the forward direction of the wheelchair 20 is also the direction of the flow of the ride.

Figure 3:
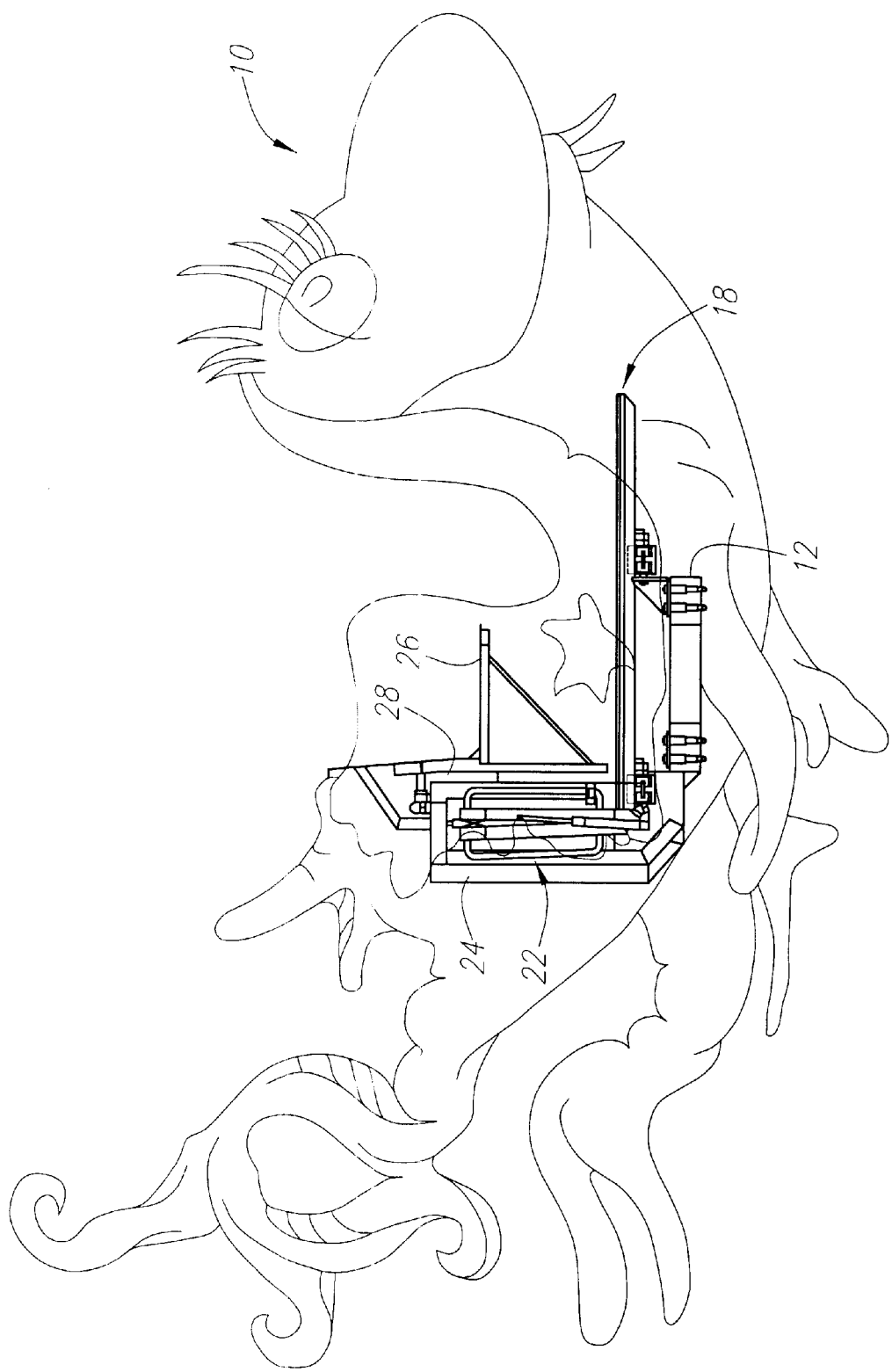
FIG. 3 is a right side view of the vehicle shown in FIG. 1 with the ramp assembly in the retracted operational position.
Figure 4:
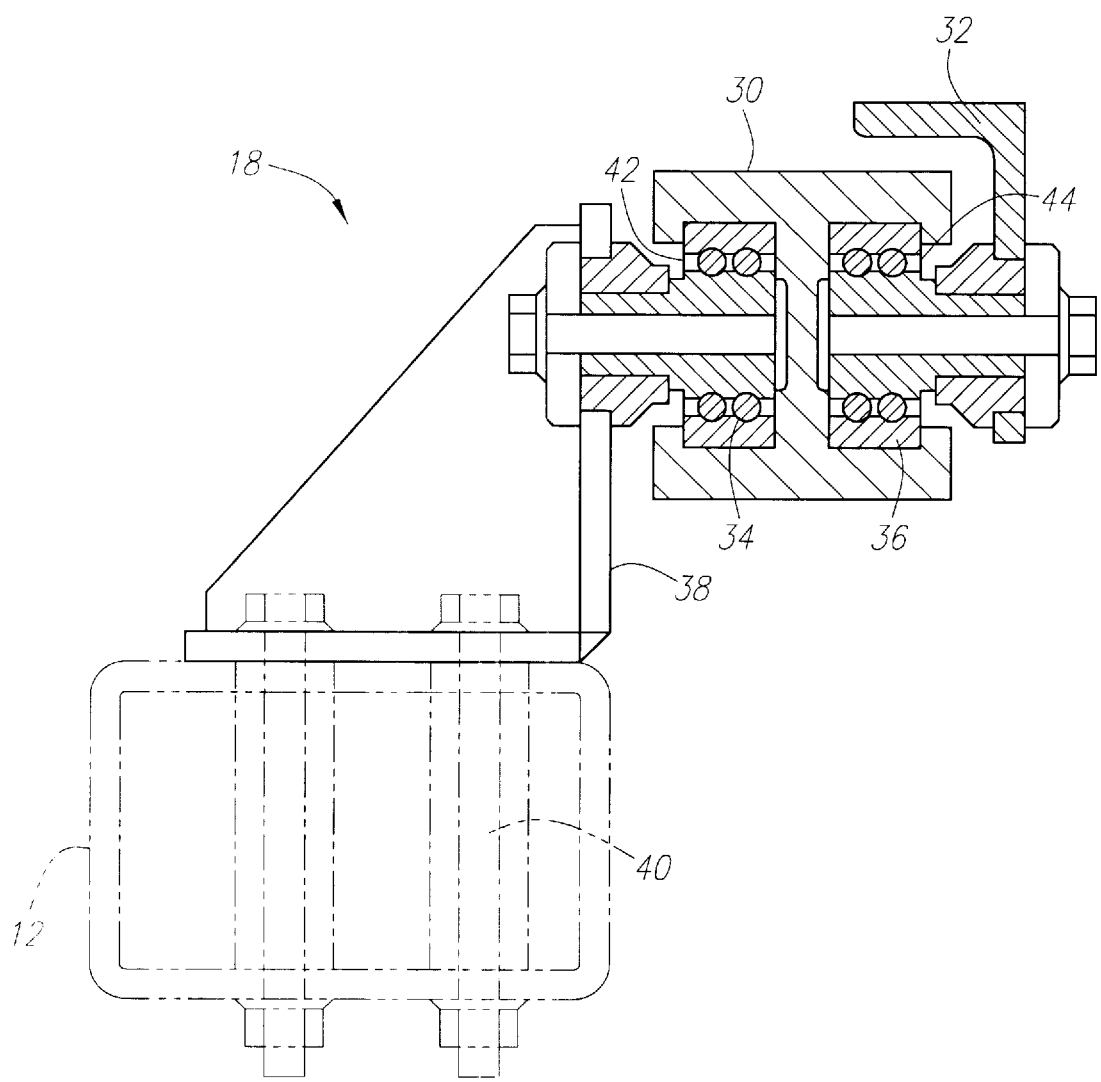
FIG. 4 is a right side view of the rail assembly of the vehicle shown in FIG. 1.

FIG. 3 shows the vehicle 10 in motion. FIGS. 1 and 3 illustrate that the floor deck assembly 18 is entirely contained within the vehicle body while the ride is operating. However, unlike FIGS. 1 and 2, FIG. 3 shows a ramp assembly 22 supported by the floor deck assembly 18 and stowed behind a backrest 24 mounted onto the support beams 12. Referring to FIG. 3, a companion seat 26 can be seen near the backrest 24. The companion seat 26 is an integral part of the vehicle 10 and part of the fiberglass vehicle assembly. The companion seat 26 enables another guest to accompany a guest in a wheelchair 20. A conversion seat 28 is mounted to the backrest 24. The conversion seat 28 allows the ride capacity to be maintained at all times, if no guest in a wheelchair 20 is being accommodated. The conversion seat 28 is of two-fold design and can easily be deployed and locked in place by a park operator. The compact design package of the conversion seat 28 makes the entire assembly capable of being hidden underneath the companion seating area. Guest restraints (not shown) are provided to ensure the safety of the guests while seated. While the floor deck assembly 18 can be seen in FIG. 3, the particular configuration of the floor deck assembly 18 is best illustrated in FIGS. 4 and 5.

Figure 5:
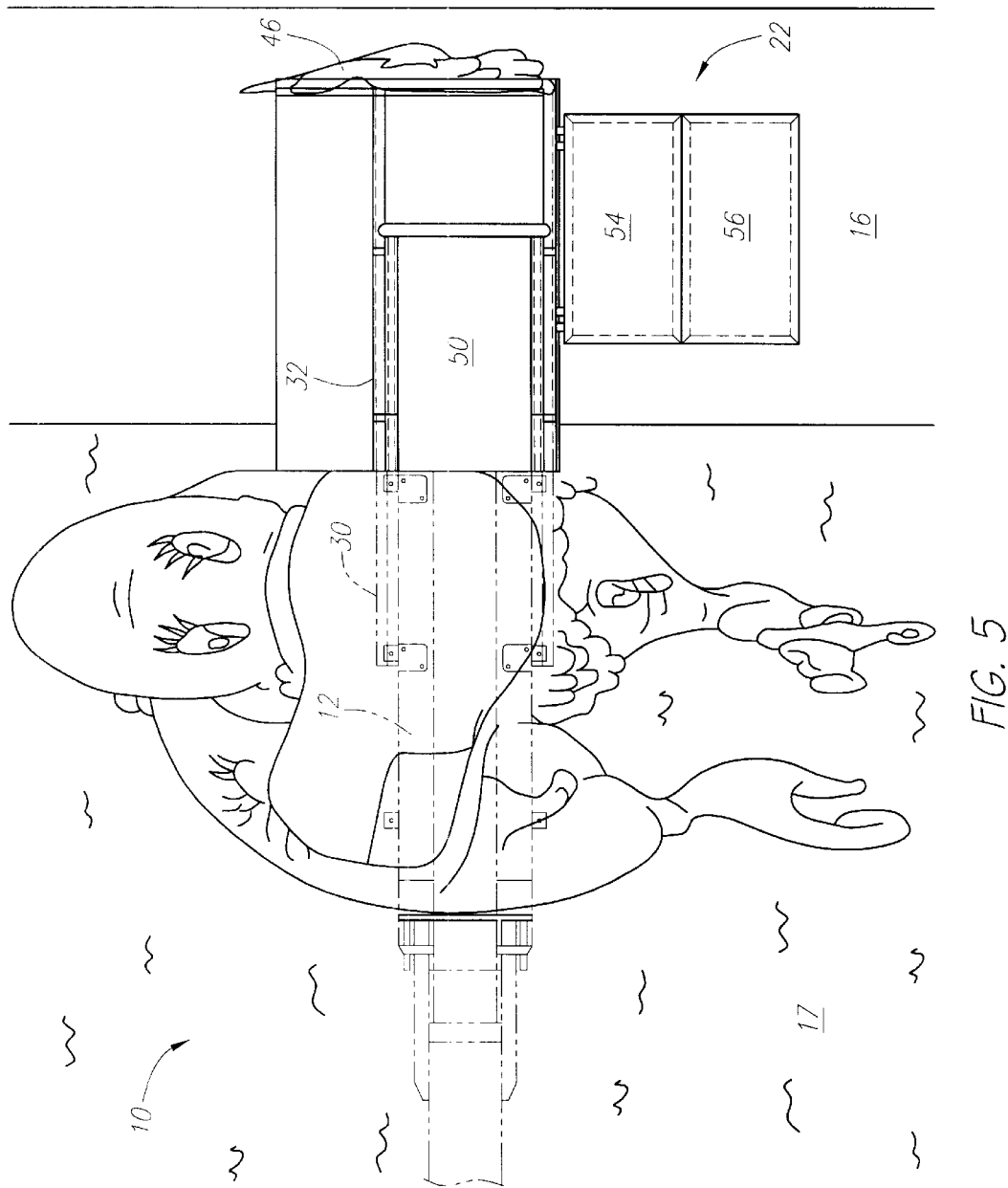
FIG. 5 is a top view of the vehicle shown in FIG. 1 with the ramp assembly in an extended position.
Figure 7:
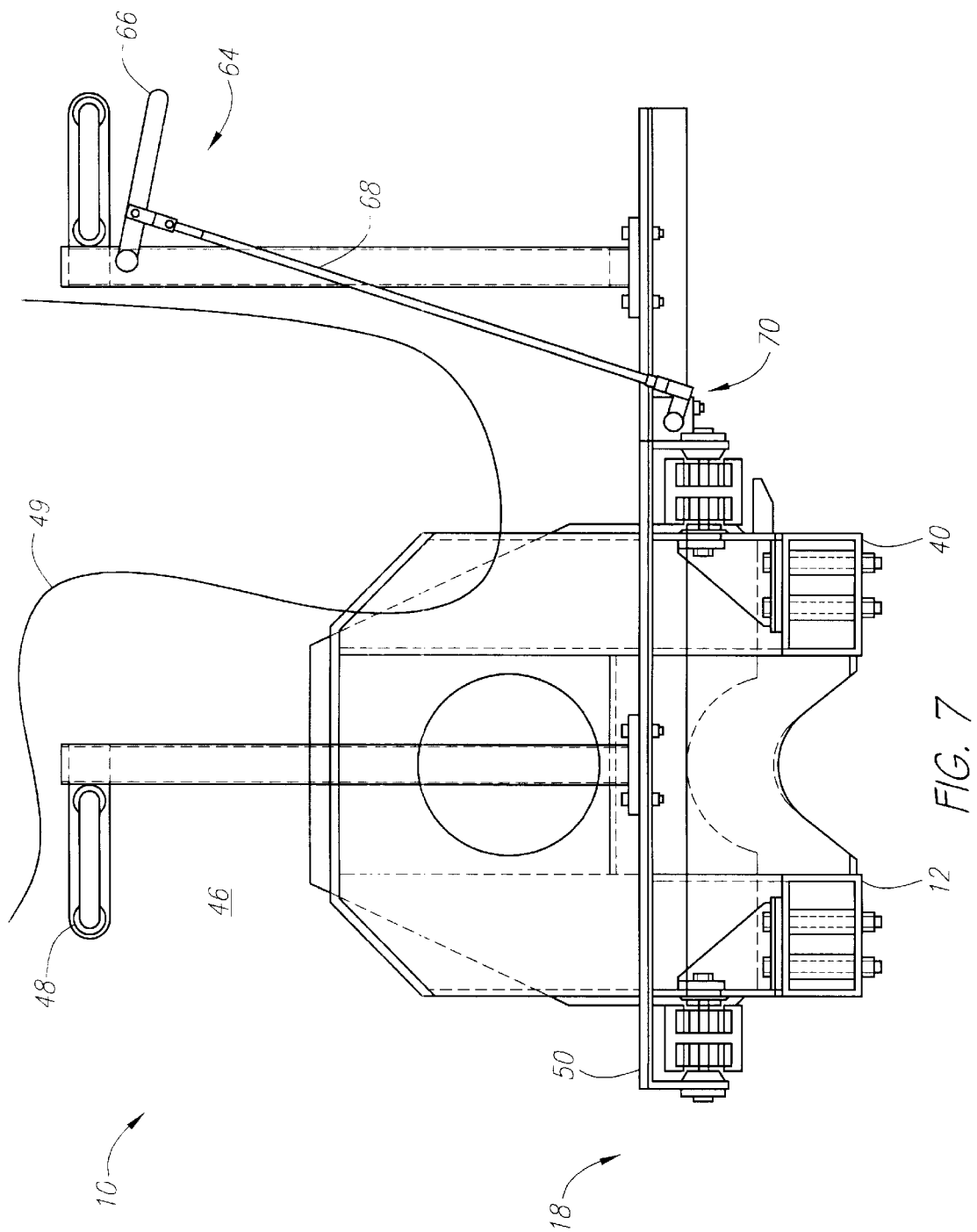
FIG. 7 is a right side view of the vehicle shown in FIG. 1 with the vehicle door unlocking device in the operational position.

The floor deck assembly 18 preferably includes parallel I-track guiderails 30 slideably mounted to the support beams 12 and parallel L-track guiderails 32 slideably mounted to the I-track guiderails 30 for telescopically extending the floor deck assembly 18 away from the vehicle body toward the loading platform 26 when the vehicle 20 is at rest (as shown in FIG. 5). The floor deck assembly 18 has a first set of roller bearings 34 mounted to each support beam 12 via a bracket 38 and two hexagon screws 40. Each I-track guiderail 30 defines a first groove 42 and an opposing second groove 44. The first set of roller bearings 34 is slideably engageable with the first groove 42. A second set of roller bearings 36 is slideably engageable with the second groove 44. Each L-track guiderail 32 is mounted to the second set of roller bearings 36. Preferably, the roller bearings 34, 36 are self-lubricating. The L-track guiderails 32 support the floor 50 or platform of the floor deck assembly 18. The door 46 (as shown in FIGS. 2, 5, and 7) of the vehicle is mounted on the floor 50 opposite the arm 14. The door 46 has a pair of handles 48 (as shown in FIG. 7) for extending and retracting the floor assembly 18 from and into the body of the vehicle 10, respectively.

Figure 6:
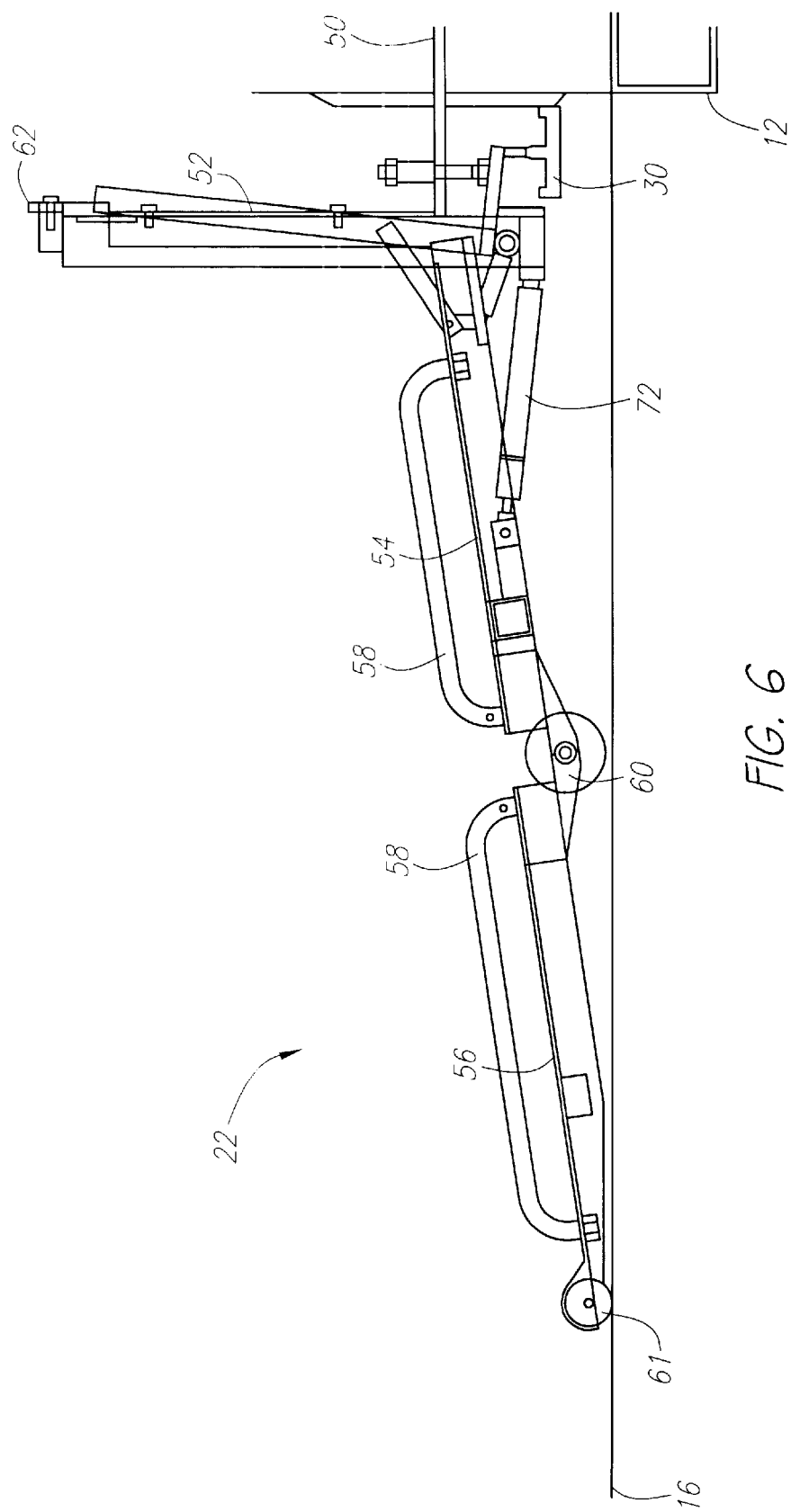
FIG. 6 is a right side view of the vehicle shown in FIG. 1 with the ramp assembly in an extended position.

Referring to FIGS. 5 and 6, the ramp assembly 22 is mounted to the floor 50 of the floor deck assembly 18 near the door 46 of the vehicle 10. The ramp assembly 22 includes a frame 52, two plates 54, 56, a gas pressure cylinder 72, two sets of guide rails 58, two sets of rollers 60, 61, and an automatic latch mechanism 62. The frame 52 supports the first plate 54 at one end. The gas pressure cylinder 72 interconnects the frame 52 to the first plate 54. The first plate 54, foldably connected to the second plate 56, is adapted to swivel about the frame 52 for extending the ramp assembly 22 away from and at an angle to the floor deck assembly 18 to accommodate a guest in a wheelchair 20. In this manner, the ramp assembly 22 unfolds backward to the direction of the flow of the ride. This design holds the orientation of the guest in their wheelchair 20 to the normal running direction of the ride thus eliminating unnecessary turning of the wheelchair 20. When unfolded, the ramp assembly 22 measures approximately 33 inches long by 32 inches wide. Constructed of steel and made of anti-slip material, the ramp assembly 22 is light in weight for ease in handling by the park operator.

Each plate 54, 56 has a set of guide rails 58 for preventing wheelchair wheels from slipping off the ramp assembly 22. The guide rails 58 are also used as hand holds in the process of folding or unfolding the plates 54, 56 over the frame 52 for stowage or deployment purposes, respectively. Centrally located, the first set of rollers 60 provides stability in the center of the ramp assembly 22 when a guest in a wheelchair 20 is accessing the vehicle 10. The second set of rollers 61 prevents the ramp assembly 22 from damaging the loading platform 16 during deployment, as well as provides a smooth rolling action when the ramp assembly 22 makes contact with the loading platform 16 during stowage and deployment.

When stowed, the ramp assembly 22 is kept in place by the automatic latch mechanism 62 and is released by the park operator from the loading platform 16. The automatic latching mechanism 62 promotes safety since the ride will not start if the ramp assembly 22 is not locked in place.

Advantageously, the particular configuration of the ramp assembly 22 meets desired required ramp angle ratios, permits compact stowage without compromising safety, convenience, and undue expense in construction, and enables a guest in a wheelchair 20 to gain entry to the vehicle 10 from the loading platform 16 without leaving their wheelchair 20 and enjoy an amusement ride without turning their wheelchair 20.

Referring to FIG. 7, the door 46 of the vehicle 10 has two handles 48 near the entrance 49 and a door locking mechanism 64 disposed underneath one handle 48. The door locking mechanism 64 has a lever 66 attached to a rod 68 which is in turn mounted to a release bar 70 horizontally extending the length of the I-track guide rail 30 opposite the ramp assembly 22. The release bar 70 is adapted to maintain the door 46 in a locked position when the vehicle 10 is in motion. Similar to the automatic latch mechanism 62 of the ramp assembly 22, for safety purposes, if the door 46 is not completely pushed back and in the locked position, an override switch connected to the release bar 70 prevents the ride from running.

In operation, at a designated stopping position of the ride, the park operator opens the vehicle door 46 towards the loading platform 16. This further deploys the floor 50 of the floor deck assembly 18 such that the floor passes over the water 17 and stops above the loading platform 16. The park operator will then unfold the ramp assembly 22 in preparation to load a guest in a wheelchair 20. In a situation where the guest in a wheelchair 20 has a companion, the companion must enter the vehicle 10 first, occupy the companion seat 26, and preferably strap on the seat belt or guest restraint (not shown). The guest in a wheelchair 20 is then wheeled up the ramp assembly 22 by the park operator or self-propelled by the guest in a wheelchair 20. When the guest in a wheelchair 20 gets on board the floor 50, the ramp assembly 22 is folded by the park operator and secured by the automatic latching mechanism 62. The vehicle door 46 is then pushed back inside the vehicle 10 in its fully retracted operational position. The guest in a wheelchair 20 may then be further secured into the vehicle 10 by a seat belt or guest restraint (not shown). The unload procedure is the reverse of the above-identified load procedure. If no guest in a wheelchair 20 is being accommodated, the park operator will deploy the conversion seat 28 by unlocking and unfolding the conversion seat 28 hidden underneath the companion seating area.

Thus, an amusement ride vehicle that accommodates a guest in a wheelchair and another guest in a companion seat has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An amusement ride vehicle comprising:
   a first support beam;
   a second support beam opposing the first support beam;
   a floor deck assembly supported by each beam;
   a door supported by the floor deck assembly and having a handle;
   a ramp assembly supported by the floor deck assembly; and
   a backrest supported by the first support beam and adapted to partially enclose the ramp assembly when the amusement ride vehicle is in motion.

2. An amusement ride vehicle according to claim 1 further comprising a companion seat near the backrest to accommodate seating area for a companion of a guest in a wheelchair.

3. An amusement ride vehicle according to claim 2 further comprising a conversion seat mounted to the backrest and adapted to fold up between the backrest and the companion seat.

4. An amusement ride vehicle according to claim 1, the ramp assembly having a first plate foldably connected to a second plate, the first plate adapted to swivel about the floor deck assembly for deploying the ramp assembly to an extended, inclined position to assist a guest entering and exiting the vehicle.

5. An amusement ride vehicle according to claim 1, the door having a vehicle door locking mechanism.

6. An amusement ride vehicle according to claim 1, the ramp assembly having anti-slip material.

7. An amusement ride vehicle according to claim 1, the ramp assembly having an automatic latch mechanism.

8. An amusement ride vehicle according to claim 1, the floor deck assembly having a first set of bearings mounted to each beam, an I-track guiderail defining a first groove and an opposing second groove, the first set of bearings slideably engageable with the first groove, a second set of bearings slideably engageable with the second groove, and a L-track guiderail mounted to the second set of bearings.

9. An amusement ride vehicle according to claim 1, each support beam having a first end and an opposing second end, the first end being mounted to an arm.

10. An amusement ride vehicle according to claim 1, the floor deck assembly being telescopically extendible away from an arm.

11. An amusement ride vehicle according to claim 1, the floor deck assembly having a platform and a door mounted thereon, the floor deck assembly being slideable about each support beam to assist a guest entering and exiting the vehicle.

12. An amusement ride vehicle according to claim 11, the ramp assembly mounted to the floor deck assembly proximate the door and extended at an angle to the first support beam when the ramp assembly is deployed for loading or unloading a guest.

13. An amusement ride vehicle comprising:
a frame;
a vehicle body supported by the frame, the vehicle body having a floor for supporting a guest in a wheelchair, wherein the floor is extendible away from the vehicle body for loading or unloading the guest; and
a ramp extendible away from the floor for allowing the guest to gain entry to the vehicle without leaving their wheelchair and enjoy an amusement ride without turning their wheelchair, wherein the ramp is extended substantially orthogonally away from the floor when the ramp is deployed for loading or unloading the guest.

14. An amusement ride vehicle according to claim 13 wherein the ramp is extended at an angle to the floor when the ramp is deployed for loading or unloading a guest.

15. An amusement ride vehicle according to claim 13 wherein the frame includes a first beam and a second beam, the amusement ride vehicle further comprising a first guiderail slideably engageable with the first beam, and a second guiderail slideably engageable with the second beam.

16. An amusement ride vehicle according to claim 13 wherein the floor is supported by each guiderail.

17. An amusement ride vehicle according to claim 13 further comprising a companion seat supported within the vehicle body.

18. An amusement ride vehicle according to claim 17 further comprising a conversion seat mounted to the frame and adapted to fold up between the frame and the companion seat.

19. An amusement ride vehicle comprising:
a first support beam;
a second support beam opposing the first support beam;
a floor deck assembly supported by each beam, the floor deck assembly being telescopically extendible away from an arm;
a ramp assembly supported by the floor deck assembly; and
a backrest supported by the first support beam and adapted to partially enclose the ramp assembly when the amusement ride vehicle is in motion.

20. An amusement ride vehicle comprising:
a frame;
a vehicle body supported by the frame, the vehicle body having a floor for supporting a guest in a wheelchair, wherein the floor is extendible away from the vehicle body for loading or unloading the guest;
a ramp extendible away from the floor for allowing the guest to gain entry to the vehicle without leaving their wheelchair and enjoy an amusement ride without turning their wheelchair;
a companion seat supported within the vehicle body; and
a conversion seat mounted to the frame and adapted to fold up between the frame and the companion seat.

* * * * *